United States Patent [19]

Barlow et al.

[11] Patent Number: 4,503,176

[45] Date of Patent: Mar. 5, 1985

[54] PROCESS FOR THE MANUFACTURE OF A CUTBACK OF A MIXTURE OF BITUMEN AND RUBBER

[75] Inventors: Peter L. Barlow, Sutton; Kenneth M. Riches, Northwich, both of England

[73] Assignee: Shell Oil Company, Houston, Tex.

[21] Appl. No.: 454,939

[22] Filed: Jan. 3, 1983

[30] Foreign Application Priority Data

Jan. 11, 1982 [GB] United Kingdom ............... 8200708

[51] Int. Cl.³ .......................... C08L 7/00; C08L 9/00; C08L 53/02; C08L 95/00
[52] U.S. Cl. ........................................ 524/62; 524/68; 524/71; 524/572; 524/573; 524/574; 524/575; 524/576; 524/474; 525/54.5
[58] Field of Search ................ 524/62, 68, 71, 572, 524/573, 574, 575, 576, 474; 525/54.5

[56] References Cited

U.S. PATENT DOCUMENTS

| | | | |
|---|---|---|---|
| 3,919,148 | 11/1975 | Winters et al. | 524/62 |
| 3,963,659 | 6/1976 | Binder et al. | 524/70 |
| 4,085,078 | 4/1978 | McDonald | 524/62 |
| 4,166,049 | 8/1979 | Huff | 524/62 |
| 4,332,705 | 6/1982 | Uffner | 525/54.5 |
| 4,419,469 | 12/1983 | Böhm et al. | 524/68 |

*Primary Examiner*—Allan M. Lieberman
*Attorney, Agent, or Firm*—Peter A. Bielinski

[57] ABSTRACT

A cutback of a mixture of bitumen and rubber is prepared by treating a mixture of bitumen and rubber with a peroxide at 100°–240° C. and adding a volatile solvent. The obtained cutback can easily be sprayed on roads and shows a good retention for chippings.

7 Claims, No Drawings

PROCESS FOR THE MANUFACTURE OF A CUTBACK OF A MIXTURE OF BITUMEN AND RUBBER

BACKGROUND OF THE INVENTION

1. Field of the Invention

This invention relates to a process for the manufacture of a cutback of a mixture of bitumen and rubber and to a cutback thus obtained.

2. Description of the Prior Art

Cutbacks of mixtures of bitumen and rubber can suitably be used, e.g. for surface dressings on roads, in particular on sites exposed to high stresses caused by heavy turning traffic. The cutback is sprayed at the road surface whereafter the surface is covered with chippings, which are preferably precoated with bitumen. The volatile solvent of the cutback, e.g. kerosine, then slowly evaporates and the chippings should show a good retention to the road surface, even under the above-mentioned heavy conditions.

A drawback of such cutbacks is the tendency to form a skin of rubbery material at the upper surface, which skin prevents the further evaporation of the solvent. This causes loss of most of the chippings under said heavy conditions.

The treatment of a mixture of bitumen and rubber with a peroxide in order to prepare cross-linked homogeneous bituminous compositions which are suitable for e.g. road-building is disclosed in U.S. Pat. No. 3,963,659. The use of cutbacks of these mixtures and the above-described problem encountered with such cutbacks are not mentioned.

SUMMARY OF THE INVENTION

The purpose of the invention is providing a cutback which does not show this disadvantage.

The invention relates to a process for the manufacture of a cutback of a mixture of bitumen and rubber comprising treating a mixture of bitumen and rubber with a free radical generator, usually a peroxide at a temperature which, dependent on the choice of the free radical generator, gives a reasonable half life of the latter, preferably between 100° and 240° C., and then mixing with at least 5%w, based on the obtained mixture, of a volatile solvent.

DETAILED DESCRIPTION OF THE INVENTION

The bitumen preferably has an aromaticity, expressed as the fraction of aromatic carbon in the n-heptane maltene phase ($f_a$) higher than $0.004 \times P + 0.280$, in which P represents the n-heptane asphaltenes content of the bitumen. Petroleum bitumen is preferred.

The bitumen may be a distillation bitumen, a precipitation bitumen, a blown bitumen and blends of two or more of the bitumens mentioned hereinbefore. Preference is given to the application of a distillation bitumen, a precipitation bitumen or a blend of a distillation and a precipitation bitumen.

Very suitable are blends of one or more of the above-mentioned bitumens with aromatic petroleum extracts, aromatic petroleum distillates or paraffinic-naphthenic petroleum distillates in such a proportion that the above-mentioned aromaticity according to the invention is also reached. When a bituminous component of this type is applied preference is given to a blend of a precipitation bitumen and an aromatic petroleum extract, in particular a blend of a propane bitumen and an aromatic extract of a heavy lubricating oil.

The present compositions are preferably prepared starting from bituminous components having a penetration at 25° C. between 10 and 2000 (ASTM D-5-73).

The rubber can be a natural or a synthetic rubber and preferably is an unsaturated rubber. Examples are homopolymers and copolymers of alkadienes and random, tapered and block copolymers of alkadienes and/or alkenes and/or monovinyl aromatic monomers. Suitable alkadienes are conjugated alkadienes, such as butadiene and isoprene. Suitable monovinyl aromatic monomers are styrene and alkyl styrenes. Blends of more than one rubber may also be used.

Preferred are linear or branched synthetic rubbers having the general formula:

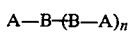

wherein each A is a thermoplastic polymer block of a monovinyl aromatic hydrocarbon or a 1-alkene, B is an elastomeric polymer block of a conjugated diene or more than 1-alkene and n is an integer, suitably from 1 to 5, or a partly or fully hydrogenated derivative of the block copolymer.

The polymer blocks A preferably have a number average molecular weight, in the range of from 2,000 to 100,000, particularly from 7,500 to 50,000. The polymer block B preferably has an average molecular weight in the range of from 25,000 to 1,000,000, particularly from 35,000 to 150,000. Whenever according to the branched configuration two or more blocks B are immediately adjacent to each other they are treated as a single block for purposes of molecular weight. The amount of polymer blocks A in the block copolymers preferably ranges from 10 to 70%w, particularly from 20 to 50%w. As examples of monovinyl aromatics suitable for the preparation of the polymer blocks in the present block copolymers may be mentioned styrene and alpha-methyl styrene. As conjugated dienes suitable for the preparation of the polymer blocks B in the present block copolymers, preferably dienes with from 4 to 8 carbon atoms per molecule are chosen, particularly butadiene and isoprene. Polymer blocks B may also be derived by the copolymerization of one or more conjugated dienes with one or more monovinyl aromatic compounds. The 1-alkenes useful for the preparation of either the thermoplastic blocks A or the elastomeric blocks B include 1-alkenes having from 2 to 12 carbon atoms per molecule, such as ethylene, propylene, butene-1, hexene-1 and octene-1.

Suitable examples of the block copolymers considered herein are as follows: polystyrene-polyisoprene-polystyrene, polystyrene-polybutadiene-polystyrene, polyethylene-(ethylene-propylene copolymer)-polyethylene, and their hydrogenated counterparts, particularly of the block copolymers containing diene homopolymer blocks.

The rubbers may be mixed with extender oils, such as nonvolatile petroleum oils.

Preferred proportions of rubber are between 1 to 25%w, preferably 3-10%w, based on the bitumen/rubber blend.

These blends may contain additional ingredients, such as carbon black, etc.

Suitable peroxides are organic peroxides, preferably dicumyl peroxide, di-tertiary butyl peroxide and tertiary butyl hydroperoxide.

Preferred proportions of peroxide are between 0.5 and 5%w, preferably 1–3%w, based on the bitumen/rubber blend.

Suitable volatile solvents are volatile petroleum oil fractions, such as kerosine. Preferred proportions are 5–30%w, preferably 10–20%w, based on the bitumen/rubber blend.

In the present process the bitumen should thoroughly be mixed with the rubber, e.g. for 1–5 hours, and preferably prior to the addition of the peroxide. This mixing should take place at 120°–240° C., preferably 140°–180° C., so that the viscosity of the mixture is low enough to allow for efficient mixing. If desirable the bitumen can be partly cutback, e.g. with kerosine, to lower the viscosity of the mixture.

The peroxide is preferably added after a homogeneous or finely dispersed bitumen/rubber blend is obtained. Mixing is then continued, preferably at 120°–160° C., for a further 0.5–5 hours. Then the volatile solvent is added to produce a sprayable mixture, preferably sprayable at a temperature of 130°–160° C.

The cutbacks of this invention are particularly suitable for surface dressings on roads, but can also be used for other purposes, such as in the roofing and building industry and for hydraulic works.

EXAMPLES 1. 96%w distillation petroleum bitumen, penetration 200 (25° C., 0.1 mm, ASTM D-5-73) (200 kg) and 4%w polystyrene/polybutadiene/polystyrene block copolymer (mol. wt 16,200/137,600/16,200) were stirred at 160°–170° C. for 1.5 hours. The blend was cooled to 140° C. and 2%w dicumyl peroxide was then added in one lot. The mixture was stirred vigorously at 140° for a further 3 hours. To this mixture 15%w kerosine was added to produce a cutback having a viscosity of 80 cS at 150° C. and being easily sprayable by commercial road maintenance equipment at a pressure of 2.6 bar at 150°–160° C.

Road trials were carried out with this cutback at a site exposed to heavy turning traffic. The surface dressing prepared with this cutback cured with no skin formation and the chippings were retained.

2. Example 1 was repeated except that 1.5%w of the peroxide, a mixing time after adding the peroxide of 1.5 hours at 140° C. and 9%w kerosine were used to produce an easily sprayable cutback.

3. Example 2 was repeated except that 1.5%w di-t-butyl peroxide was used to produce a similar cutback.

4. Example 2 was repeated except that a branched polystyrene/polybutadiene block copolymer (mol. wt 20,000/75,000 per arm, polystyrene end block, 4 arms) was used. 5. A blend of 64%w propane bitumen and 36%w furfural extract of Bright Stock was prepared by mixing at 140° C. for 1 hour. 191.25 kg of the above blend were heated to 160° C. and 5 kg of the branched copolymer of Example 4 in a powder form were added slowly while being stirred with a high speed mixer. When a satisfactory dispersion had been achieved the temperature was lowered to 140° C. and 3.75 kg of dicumyl peroxide were added in increments over 5 minutes with continuous stirring. Samples taken at ½ hour intervals over 2 hours showed on microscopic examination to be essentially homogeneous. The resulting product was cooled to 120° C. and kerosine (19.8 kg) was added to achieve a suitable viscosity for spraying.

6. COMPARATIVE EXAMPLE

Example 1 was repeated except that no peroxide was used. The obtained cutback was a very coarse dispersion which caused blockage of spray jets and separation of the rubber phase on storage.

A surface dressing prepared with this cutback showed skin formation and quick loss of its chippings.

What is claimed is:

1. A process for the manufacture of a cutback of a mixture of bitumen and an unsaturated rubber comprising treating a mixture of bitumen and between 1 and 25% by weight of the bitumen/rubber blend of rubber which has been thoroughly mixed at between 120° C. and 240° C. with between 0.5% and 5% by weight of the bitumen/unsaturated rubber blend of a free radical generator at a temperature of between about 100° and 240° C. and then mixing with between about 5% and 30%w, based on the obtained mixture, of a volatile petroleum oil fraction solvent.

2. A process according to claim 1, wherein the rubber has the general formula:

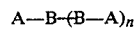

wherein each A is a thermoplastic polymer block of a monovinyl aromatic hydrocarbon or a 1-alkene, B is an elastomeric polymer block of a conjugated diene and n is an integer, suitably from 1 to 5.

3. A process according to claim 1, wherein the free radical generator is a peroxide.

4. A process according to claim 3, wherein the peroxide is dicumyl peroxide or di-tertiary butyl peroxide.

5. A process according to claim 1, wherein the volatile solvent is kerosine.

6. A process according to claim 1, wherein the bitumen and rubber are mixed to obtain a homogeneous or finely dispersed mixture, whereafter the free radical initiator is added and mixing is continued.

7. A cutback manufactured according to the process of claim 1.

* * * * *